(12) United States Patent
Grace et al.

(10) Patent No.: US 8,392,151 B1
(45) Date of Patent: Mar. 5, 2013

(54) PREVIEW OF AN OBJECT IN GRAPHICAL MODELING ENVIRONMENTS

(75) Inventors: Andrew Grace, Sherborn, MA (US); Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 818 days.

(21) Appl. No.: 11/237,182

(22) Filed: Sep. 28, 2005

(51) Int. Cl.
G06F 17/50 (2006.01)

(52) U.S. Cl. ............ 703/2; 703/22; 345/473; 345/619; 719/313

(58) Field of Classification Search ................ 703/2, 1, 703/22–24, 26; 710/1; 716/20; 717/104, 717/108; 715/234, 240, 762; 345/619, 473; 719/313

See application file for complete search history.

(56) References Cited

U.S. PATENT DOCUMENTS

| | | | | |
|---|---|---|---|---|
| 5,675,521 | A * | 10/1997 | Holzhauer et al. | 716/20 |
| 6,160,554 | A * | 12/2000 | Krause | 715/804 |
| 6,507,806 | B1 * | 1/2003 | Tandler | 703/1 |
| 7,277,572 | B2 * | 10/2007 | MacInnes et al. | 382/154 |
| 7,546,602 | B2 * | 6/2009 | Hejlsberg et al. | 719/313 |
| 7,702,409 | B2 * | 4/2010 | Lucas et al. | 700/96 |
| 2005/0138013 | A1 * | 6/2005 | Walker et al. | 707/3 |
| 2006/0010258 | A1 * | 1/2006 | Zare et al. | 710/1 |
| 2006/0117067 | A1 * | 6/2006 | Wright et al. | 707/104.1 |
| 2006/0206863 | A1 * | 9/2006 | Shenfield et al. | 717/107 |
| 2006/0224999 | A1 * | 10/2006 | Albrecht et al. | 715/853 |
| 2006/0248506 | A1 * | 11/2006 | Luo et al. | 717/104 |
| 2006/0251047 | A1 * | 11/2006 | Shenfield et al. | 370/351 |
| 2006/0288023 | A1 * | 12/2006 | Szabo | 707/100 |
| 2007/0002946 | A1 * | 1/2007 | Bouton et al. | 375/240.01 |
| 2007/0132779 | A1 * | 6/2007 | Gilbert et al. | 345/619 |
| 2007/0139441 | A1 * | 6/2007 | Lucas et al. | 345/619 |
| 2007/0165031 | A1 * | 7/2007 | Gilbert et al. | 345/473 |
| 2007/0179641 | A1 * | 8/2007 | Lucas et al. | 700/83 |
| 2008/0134060 | A1 * | 6/2008 | Albrecht et al. | 715/762 |
| 2009/0119578 | A1 * | 5/2009 | Relyea et al. | 715/234 |

* cited by examiner

*Primary Examiner* — Thai Phan
(74) *Attorney, Agent, or Firm* — Nelson Mullins Riley & Scarborough LLP (57) ABSTRACT

Graphical programming or modeling environments in which a preview window of an object is provided are disclosed. The preview window may be provided when the pointer of a pointing device hovers over an object and automatically disappear when the pointer of the pointing device is placed out of a predetermined region relating to the object. The object can be hierarchical so that the object includes a subsystem. Another preview window may be provided when the pointer of the pointing device hovers over the subsystem and automatically disappear when the pointer of the pointing device is placed out of a predetermined region relating to the subsystem. The subsystem of the object may also include another subsystem.

20 Claims, 11 Drawing Sheets

PREVIEW OF AN OBJECT IN GRAPHICAL MODELING ENVIRONMENTS

FIELD OF THE INVENTION

The present invention relates to graphical programming or modeling environments, in particular to methods, systems and mediums for providing the preview window of an object in the graphical programming or modeling environments.

BACKGROUND OF THE INVENTION

Recently, various classes of graphical programs have been used to describe computations that can be performed on application-specific computing hardware, such as a computer, microcontroller, FPGA, and custom hardware. Classes of such graphical programs may include time-based block diagrams, such as those found within Simulink® from The MathWorks, Inc. of Natick, Mass., state-based and flow diagrams such as those found within Stateflow® from The MathWorks, Inc. of Natick, Mass., and data-flow diagrams. A common characteristic among these various forms of graphical programs is that they define semantics on how to execute the programs.

A graphical program can be hierarchical so that the graphical program includes a subsystem. A subsystem refers to a collection of components that is represented by a single component with input and output signals. The input and output signals of the subsystem are accessible to the constituent components within the subsystem. The subsystem may also include another subsystem. In some conventional graphical programming environments, a hierarchical graphical program is displayed in a multi-window interface where clicking on a subsystem opens a new window displaying the content of the subsystem. The downside of this method is that when browsing many levels of hierarchy, many windows are opened and the user must carefully manage these windows. Otherwise, the user may suffer from window clutter. In other conventional graphical programming environments, the same window is used as the user navigates up and down the hierarchy of the graphical program. That is, the content of the subsystem is displayed in the same window as the parent graphical program. The downside of this method is that the user must use forward and backward buttons to go up and down the hierarchy and the user must normally constrain each level to fit in the size of the same window.

Additionally, other conventional graphical programming environments provide a textual hierarchical browser (often embedded within an integrated development environment) which shows the hierarchy of the graphical program. The downside of this approach is that the textual interface may not be the most natural in terms of how the user wants to navigate the graphical program. Furthermore, the conventional graphical programming environments have a problem with the display of results data. For example, a simulated block diagram may generate a vast amount of data logged in many display elements, and a corresponding number of windows have to be opened to display the data in the conventional graphical programming environments.

SUMMARY OF THE INVENTION

The present invention provides a graphical programming or modeling environment that overcomes the problems of the conventional graphical programming or modeling environments. The terms "program/programming" and "model/modeling" will be used interchangeably in the description of the present invention. The present invention provides the preview window of an object in the graphical programming environment. The preview window may be provided when the pointer of a pointing device hovers over the object, and the preview window may automatically disappear when the pointer of the pointing device is placed out of a predetermined region (e.g. a "hotspot") relating to the object. The object can be hierarchical so that the object includes a subsystem. Another cascading preview window may be provided when the pointer of the pointing device hovers over the subsystem and may automatically disappear when the pointer of the pointing device is placed out of a predetermined region relating to the subsystem. The subsystem may also include another subsystem. Using the hover mechanism, the user can quickly and efficiently navigate the graphical program without window proliferation.

In accordance with one aspect of the present invention, a method is provided for displaying the preview window of a component library in a modeling environment. The method includes the step of detecting whether the pointer of a pointing device hovers over a region relating to the component library on a display device. The method also includes the step of providing the preview window for displaying the content of the component library. A user can drag a component from the preview window and drop the component in a model window that displays the model being built by the user.

In another aspect of the invention, a method is provided for displaying the preview window of a component of a model in a modeling environment. The method includes the step of detecting whether the pointer of a pointing device hovers over a region relating to the component on a display device. The method also includes the step of providing the preview window for displaying content of the component of the model. The preview window may automatically disappear when the pointer of the pointing device is placed out of a predetermined region.

In another aspect of the invention, a method is provided for displaying the preview window of an object in a modeling environment. The method includes the step of detecting whether the pointer of a pointing device hovers over and enters the boundary of a first region relating to the object on a display device. The method also includes the step of displaying a second region for providing the preview window of the object. The preview window may be provided when the pointer of the pointing device hovers over the second region.

In another aspect of the invention, a system is provided for displaying the preview window of an object in a modeling environment. The system includes a display device and a pointing device for selecting the object on the display device. The system also includes a preview generator for providing the preview window that displays the content of the object. The preview window is provided when the pointer of the pointing device hovers over the object.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention pertains to a graphical programming or modeling environment in which a graphical program or model is created and/or executed. The terms "program/programming" and "model/modeling" will be interchangeably used in the description of the illustrative embodiment. In the description of the illustrative embodiment, the execution of the graphical program/model may also refer to the simulation of the program/model.

The illustrative embodiment may be practiced in a time-based block diagram environment, and/or a state-based and flow diagram environment. The illustrative embodiment may also be practiced in other graphical programming/modeling environments, including data flow diagram environments and Unified Modeling Language (UML) environments.

An exemplary time-based block diagram environment can be found in Simulink® from The MathWorks, Inc. of Natick, Mass. Simulink® provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user interface that allows drafting of block diagrams of the target systems. All of the blocks in a block library provided by Simulink® and other programs are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a pointer of the pointing device or keyboard) from the block library on to the window (i.e., model canvas). Simulink® also allows users to simulate the designed target systems to determine the behavior of the systems.

Stateflow® from The MathWorks, Inc. of Natick, Mass., provides an exemplary state-based and flow diagram environment. Stateflow® provides a graphical environment for modeling and designing event-driven systems. Stateflow® describes complex system behavior using finite state machine theory, flow diagram notations, and state-transition diagrams. Stateflow® models state diagrams that graphically represent hierarchical and parallel states and the event-driven transitions between the states of the systems. Stateflow® is integrated with Simulink®, which enables each of the state diagrams to be represented as its own block. Based on the state diagrams created in Stateflow®, Simulink® executes the systems to analyze the behavior of the systems.

Those of skill in the art will appreciate that the Simulink® modeling environment and the Stateflow® modeling environment are illustrative and the present invention may be practiced in other graphical modeling environments.

The illustrative embodiment of the present invention provides a block diagram environment in which the preview window of an object is displayed to the users or programmers so that the user or programmer can obtain information on the object. The object may be any object provided in the block diagram environment, such as files, file folders or directories, block libraries, and block diagrams. The preview window may display graphical information as well as text-based information on the object. The preview window may be displayed when the pointer of a pointing device hovers over the object and may automatically disappear when the pointer of the pointing device is placed out of a predetermined area relating to the object. The object may be hierarchical so that the object can include or be a subsystem. Another preview window may be displayed when the pointer of the pointing device hovers over the subsystem and may automatically disappear when the pointer of the pointing device is placed out of a predetermined area relating to the subsystem. The subsystem may also include another subsystem. Using the preview window, user can quickly navigate the hierarchy of the object and obtain information on the hierarchy of the object.

One of ordinary skill in the art will appreciate that although the illustrative embodiment is described below relative to the hierarchy of the block library and the hierarchy of the block diagram, the present invention may be practiced with any other objects, such as files and file folders or directories, in the block diagram environment.

Figure 1:
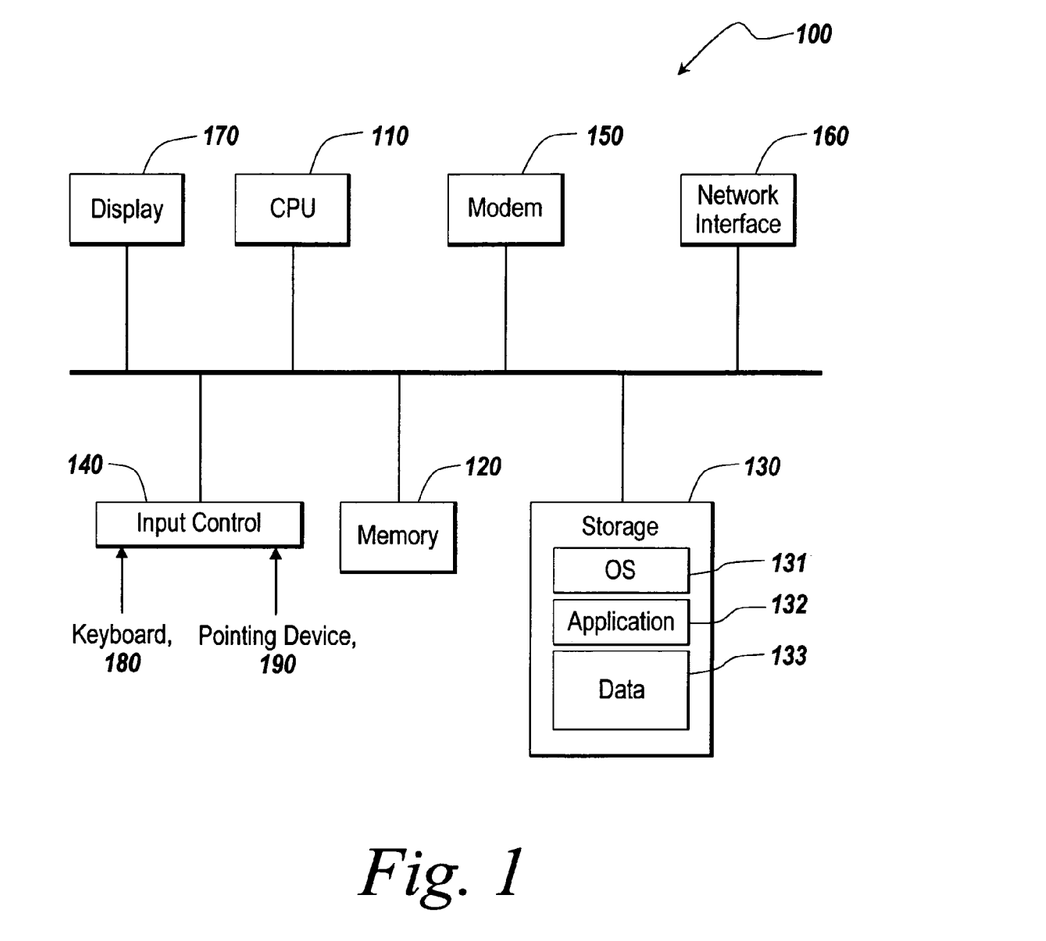
FIG. 1 shows an exemplary computing device suitable for practicing the illustrative embodiment of the present invention.

FIG. 1 is an exemplary computing device 100 suitable for practicing the illustrative embodiment of the present invention, which provides a block diagram environment. One of ordinary skill in the art will appreciate that the computing device 100 is intended to be illustrative and not limiting of the present invention. The computing device 100 may take many forms, including but not limited to a workstation, server, network computer, quantum computer, optical computer, bio computer, Internet appliance, mobile device, a pager, a tablet computer, and the like.

The computing device 100 may be electronic and include a Central Processing Unit (CPU) 110, memory 120, storage 130, an input control 140, a modem 150, a network interface 160, a display device 170, etc. The CPU 110 controls each component of the computing device 100 to provide the block diagram environment. The memory 120 temporarily stores instructions and data and provides them to the CPU 110 so that the CPU 110 operates the computing device 100 and runs the block diagram environment. The storage 130 usually contains software tools for applications. The storage 130 includes, in particular, code 131 for the operating system (OS) of the device 100, code 132 for applications running on the operation system including applications for providing the block diagram environment, and data 133 for block diagrams created in the block diagram environment.

The input control 140 may interface with a keyboard 180, a pointing device 190, and other input devices. The computing device 100 may receive through the input control 140 input data necessary for creating block diagrams, such as the selection of the attributes and operations of component blocks in the block diagrams. The pointer of the pointing device 190 may hover over an object to request the preview window of the object that can automatically disappear when the pointer of the pointing device is placed out of a predetermined area relating to the object. The computing device 100 may display in the display device 170 user interfaces for the users to edit the block diagrams.

Figure 2:
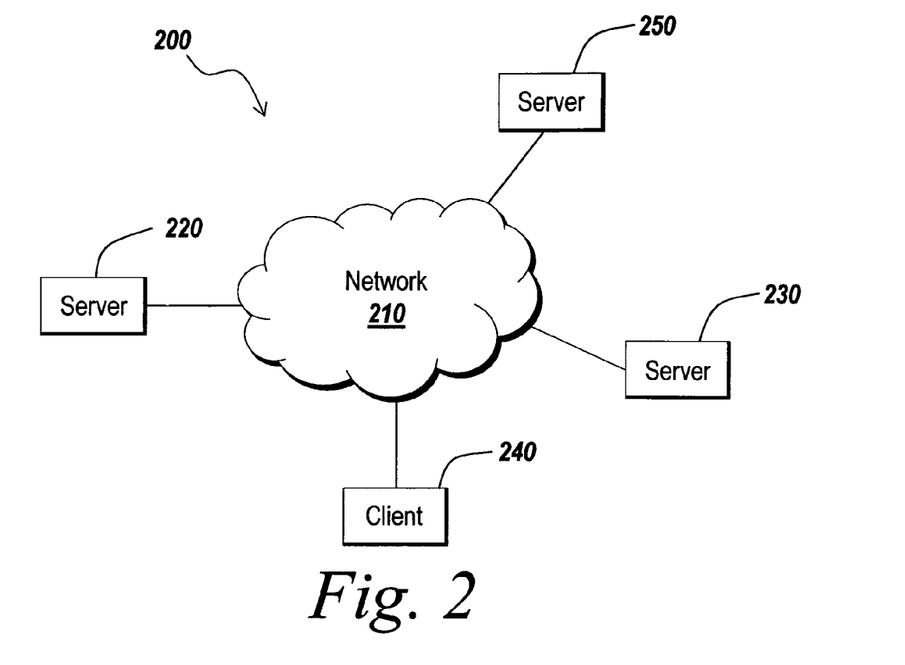
FIG. 2 shows an exemplary network environment suitable for practicing the illustrative embodiment of the present invention.

FIG. 2 is an exemplary network environment 200 suitable for the distributed implementation of the illustrative embodiment. The network environment 200 may include one or more servers 220 and 230 coupled to one or more clients 240 and 250 via a communication network 210. The servers 220 and 230 and clients 240 and 250 can be implemented using the computing device 100 depicted in FIG. 1. The network interface 160 and the modem 150 of the computing device 100 enable the servers 220 and 230 to communicate with the clients 240 and 250 through the communication network 210. The communication network 210 may include Internet, intranet, LAN (Local Area Network), WAN (Wide Area Network), MAN (Metropolitan Area Network), etc. The communication facilities can support the distributed implementations of the present invention.

In the network environment 200, the servers 220 and 230 may provide the clients 240 and 250 with software components or products under a particular condition, such as a license agreement. The software components or products may include those for providing a block diagram environment. The software components or products may also include block diagrams running in the block diagram environment. The clients 240 and 250 may create a block diagram and request the servers 220 and 230 to compile and/or execute the block diagram. The servers 220 and 230 may receive a block diagram from the clients 240 and 250, and execute the block diagram on the server 220 and 230, and provide the clients 240 and 250 with the results of executing the block diagram.

Figure 3:
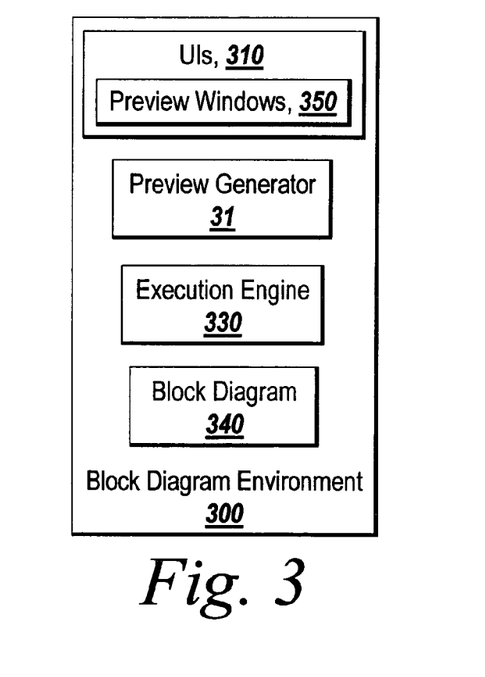
FIG. 3 depicts an exemplary block diagram environment provided in the illustrative embodiment of the present invention.

FIG. 3 is an exemplary block diagram environment 300 provided in the illustrative embodiment of the present invention. The block diagram environment 300 may include user interfaces (UIs) 310, a preview generator 320, a model execution engine 330. The UIs 310 may enable users or programmers to create or edit a block diagram 340 in the block diagram environment 300. The UIs 310 may include preview windows 340 generated by the preview generator 320. The preview windows 340 may display the content of objects in the block diagram environment 300. A preview window may be displayed when the pointer of the pointing device 190 hovers over an object and automatically disappear when the pointer of the pointing device 190 is placed out of a predetermined region relating to the object. The object may be hierarchical so that the object can include a subsystem. Another cascading preview window may be displayed when the pointer of the pointing device 190 hovers over the subsystem and automatically disappear when the pointer of the pointing device is placed out of a predetermined area relating to the subsystem. The preview windows 350 can be utilized to create or edit the block diagram 340, which will be described below in more detail with reference to FIGS. 4 and 5A-5D. Once the block diagram 340 is created, the block diagram 340 can be executed by the model execution engine 330 to determine the behavior of the block diagram 340 in the block diagram environment 300.

Figure 4:
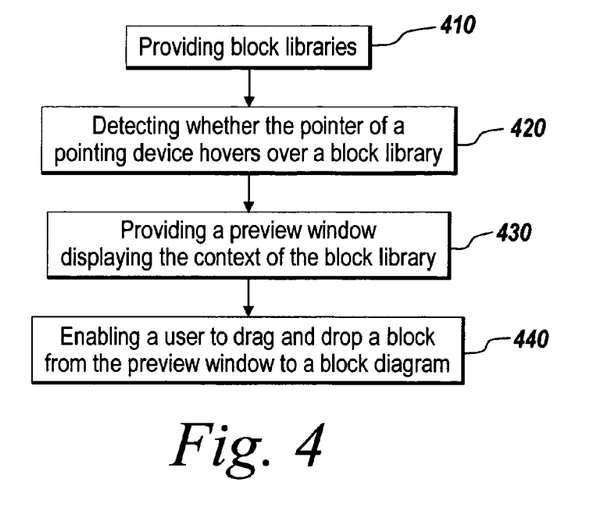
FIG. 4 is a flow chart showing an exemplary operation of the illustrative embodiment of the present invention for displaying the preview window of a block library in the block diagram environment.
Figure 5A:
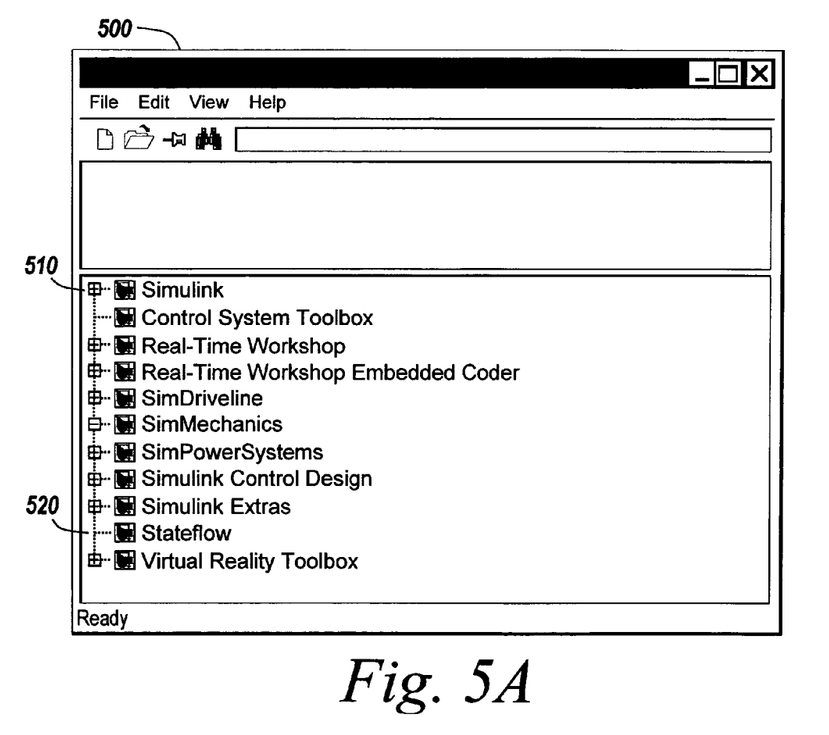
FIG. 5A depicts an exemplary user interface showing block libraries in the block diagram environment.
Figure 5B:
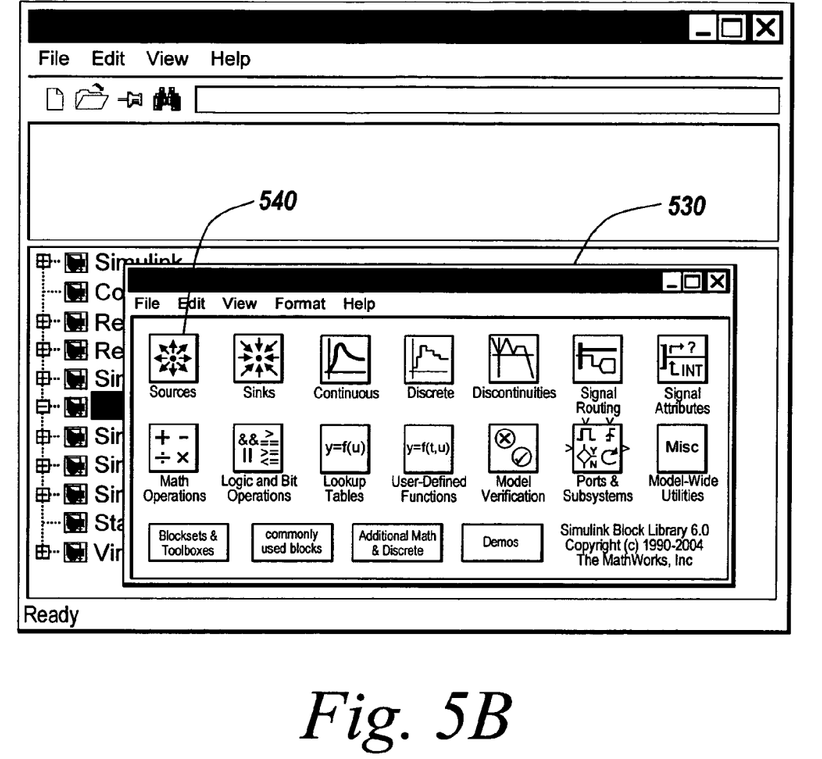
FIG. 5B depicts an exemplary preview window of a block library in the block diagram environment.
Figure 5C:
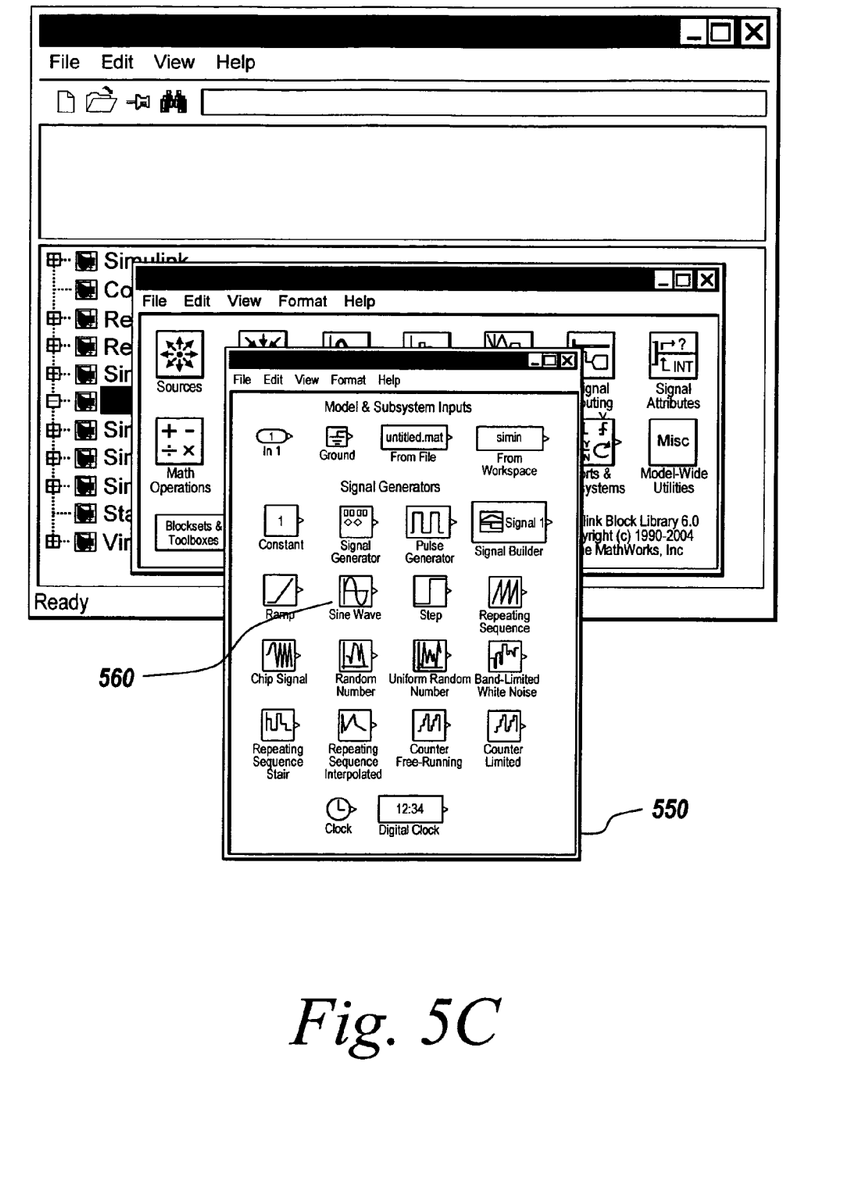
FIG. 5C depicts another exemplary preview window of a block library in the block diagram environment.

FIG. 4 is a flow chart showing an exemplary operation of the block diagram environment 300 for creating or editing a block diagram using the preview windows 340 provided in the illustrative embodiment 300. The block diagram environment 300 may provide block libraries for enabling users or programmers to use the library blocks to create or edit a block diagram (step 410). Block libraries are collections of blocks that can be copied into block diagrams. Blocks copied from a library remain linked to their originals such that changes in the originals automatically propagate to the copies in a block diagram. Block libraries facilitate reuse of the same block in a number of different block-diagrams. FIG. 5A is an exemplary user interface 500 showing block libraries provided in the illustrative embodiment. The block libraries include Simulink® block library 510 and Stateflow® block library 520. When the pointer of the pointing device 190 hovers over one of the block libraries (step 420), a preview window is provided to display the content of the block library (step 430). FIG. 5B is an exemplary preview window 530 provided when the pointer of the pointing device 190 hovers over the Simulink® block library 510. The preview window 520 displays the content of the Simulink® block library 510. In the illustrative embodiment, the Simulink® block library 510 is hierarchical so that the Simulink® block library 510 includes sub-libraries displayed in the preview window 530. The preview window 530 may be displayed as long as the pointer of the pointing device 190 is placed within the area of the Simulink® library 510 and the preview window 530. The preview window 530 may automatically disappear when the pointer of the pointing device 190 is placed out of the area of the Simulink® block library 510 and the preview window 530. FIG. 5C depicts another exemplary preview window 550 displayed when the pointer of the pointing device 190 hovers over the Sources block library 540 in the preview window 530. The preview window 550 displays the content of the Sources block library 540 including the Sine Wave block 560. The preview window 550 may be displayed as long as the pointer of the pointing device 190 is placed within the area of the Sources block library 540 and the preview window 550. The preview window 550 may automatically disappear when the pointer of the pointing device 190 is placed out of the area of the Sources block library 540 and the preview window 550.

Figure 5D:
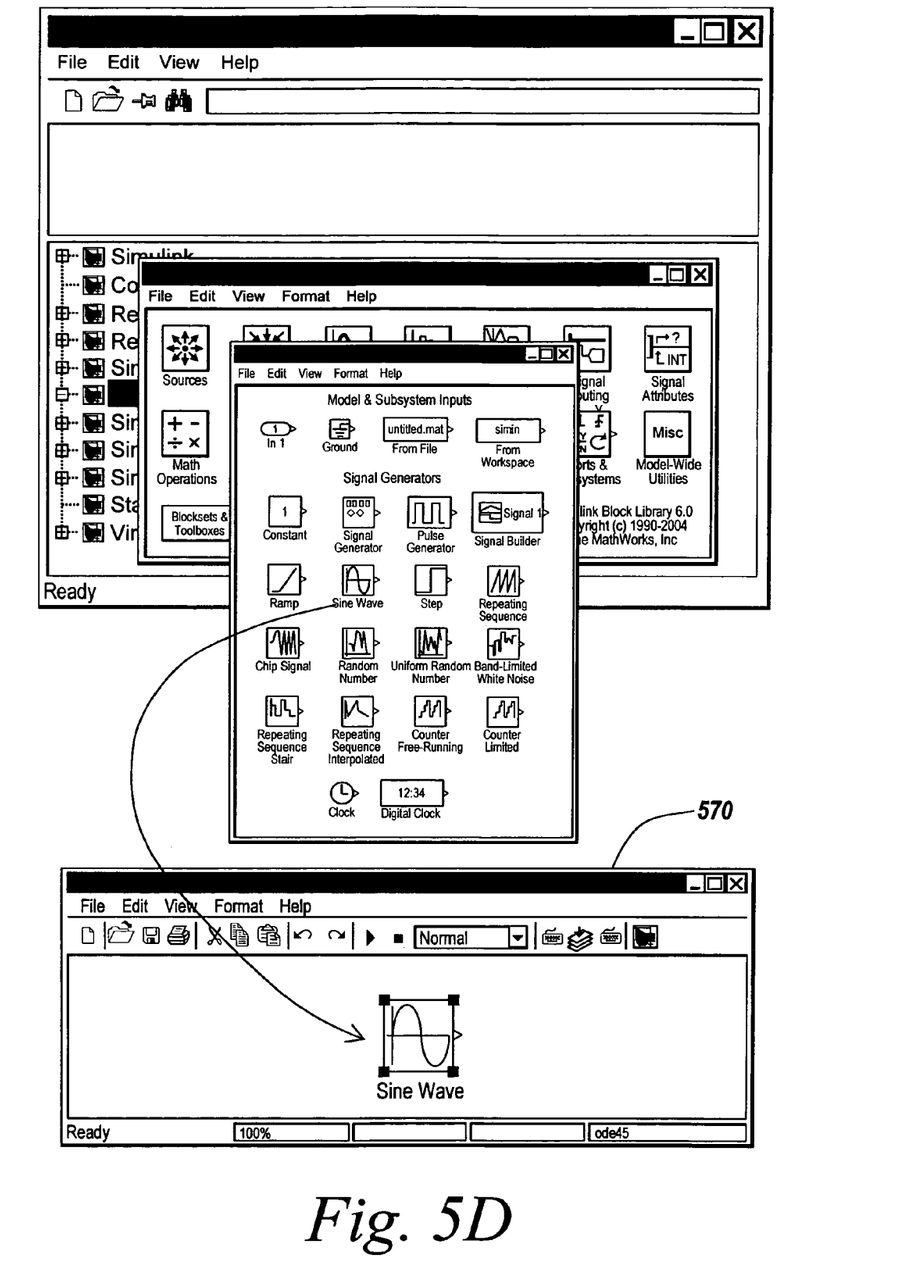
FIG. 5D depicts an exemplary drag and drop of a block from the preview window in the block diagram environment.

Referring back to FIG. 4, users may create a new block diagram or edit an existing block diagram using the blocks provided in the preview window 550. The users or programmers can pick a block in the preview window 550, drag a copy of the block from the preview window 550, and drop the block in the model window (step 440). FIG. 5D shows an exemplary drag and drop of the Sine Wave block 560 from the preview window 550. The users or programmers can pick the Sine Wave block 560 in the preview window 550, drag a copy of the Sine Wave block 560 from the preview window 550, and drop the Sine Wave block 560 in the model window 570. One of skill in the ordinary skill in the art will appreciate that the Simulink® block library 510, the Sources block library 540 and the Sine Wave block 560 are illustrative and users or programmers can repeat the above described process with any other block libraries and blocks.

In the illustrative embodiment, the preview windows 530 and 550 may filter and display block libraries or blocks belonging to a selected block library. For example, when the preview generator 320 generates the preview window 530, the preview generator 320 select the block libraries that belong to the Simulink® block library 510 from all the block libraries provided in the block diagram environment 300. In a similar manner, when the preview generator 320 generates the preview window 550, the preview generator 320 select the blocks that belong to the Sources block library 540 from all the blocks provided in the block diagram environment 300.

Although the preview windows 530 and 550 display sub-libraries and blocks that belong to the Simulink® block library 510 and the Sources block library 540, respectively, the display pattern of the preview window 530 can differ in other embodiments. For example, the preview window 530 can display all of the sub-libraries in the block diagram environment 300 and highlights the sub-libraries that belong to the Simulink® block library 510. Similarly, the preview window 550 can display all the blocks in the block diagram environment 300 or in the Simulink® block library 510 and highlights the blocks that belong to the Sources block library 540.

In the preview windows 530 and 550, various functions can also be provided by icons, mouse clicks, menus, or hot keys. One of the functions may keep the preview windows 530 and 550 open and docked. If the windows 530 and 550 are docked, the windows 530 and 550 do not disappear automatically although the pointer of the pointing device 190 is placed out of a predetermined area. Another function may replace the current window with the content of the preview windows 530 and 550. Another function may enlarge the preview windows 530 and 550. One of ordinary skill in the art will appreciate that these functions are illustrative and do not limit the scope of the present invention.

Figure 6:
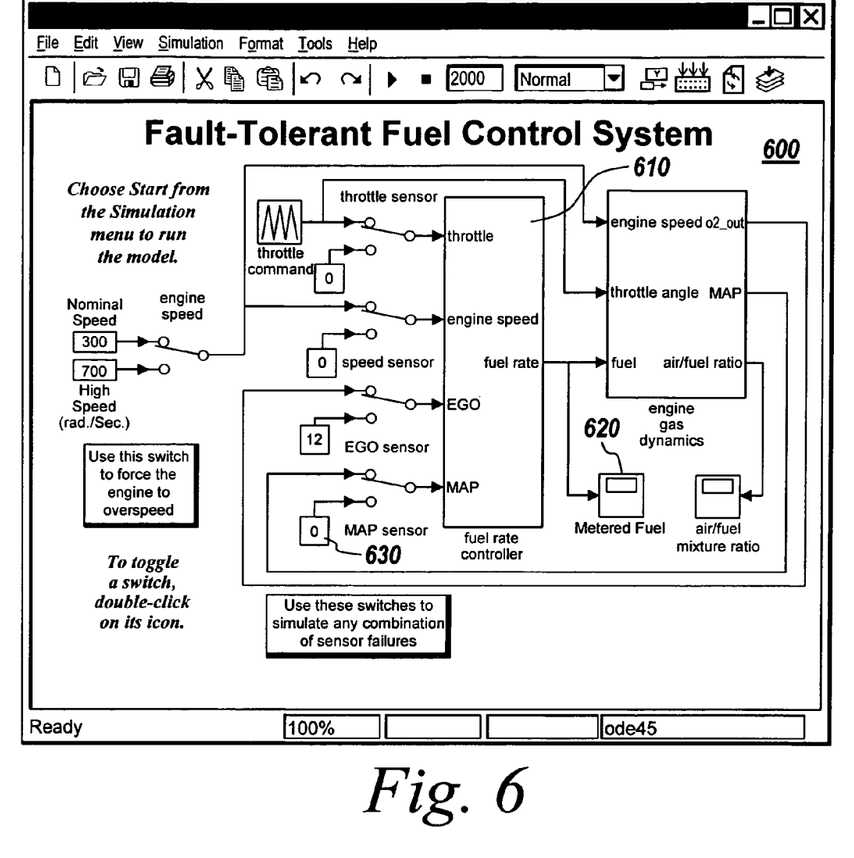
FIG. 6 depicts an exemplary model created or provided in the block diagram environment.

FIG. 6 depicts an exemplary block diagram 600 created or provided in the block diagram environment 300. In FIG. 6, the block diagram 500 is hierarchical so that the block diagram 600 includes a subsystem block 610. The block diagram 600 also includes other components, such as a scope block 620 and a sensor block 630. The scope block 620 displays its input with respect to simulation time. The scope block 620 may allow the user to adjust the amount of time and the range of input values displayed. The sensor block 630 can measure input values, such as temperature, speed, angle, motion, etc. A sensor block has two primary attributes: a value for the property it is measuring, and a regular time interval during which a new value is reported.

Figure 7:
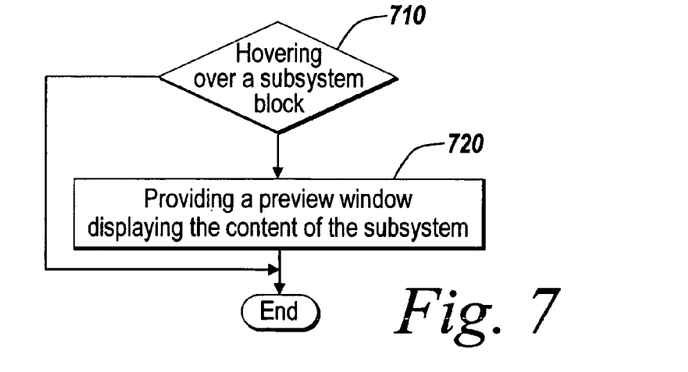
FIG. 7 is a flow chart showing an exemplary operation of the illustrative embodiment of the present invention for displaying the preview window of a block in the block diagram environment.
Figure 8A:
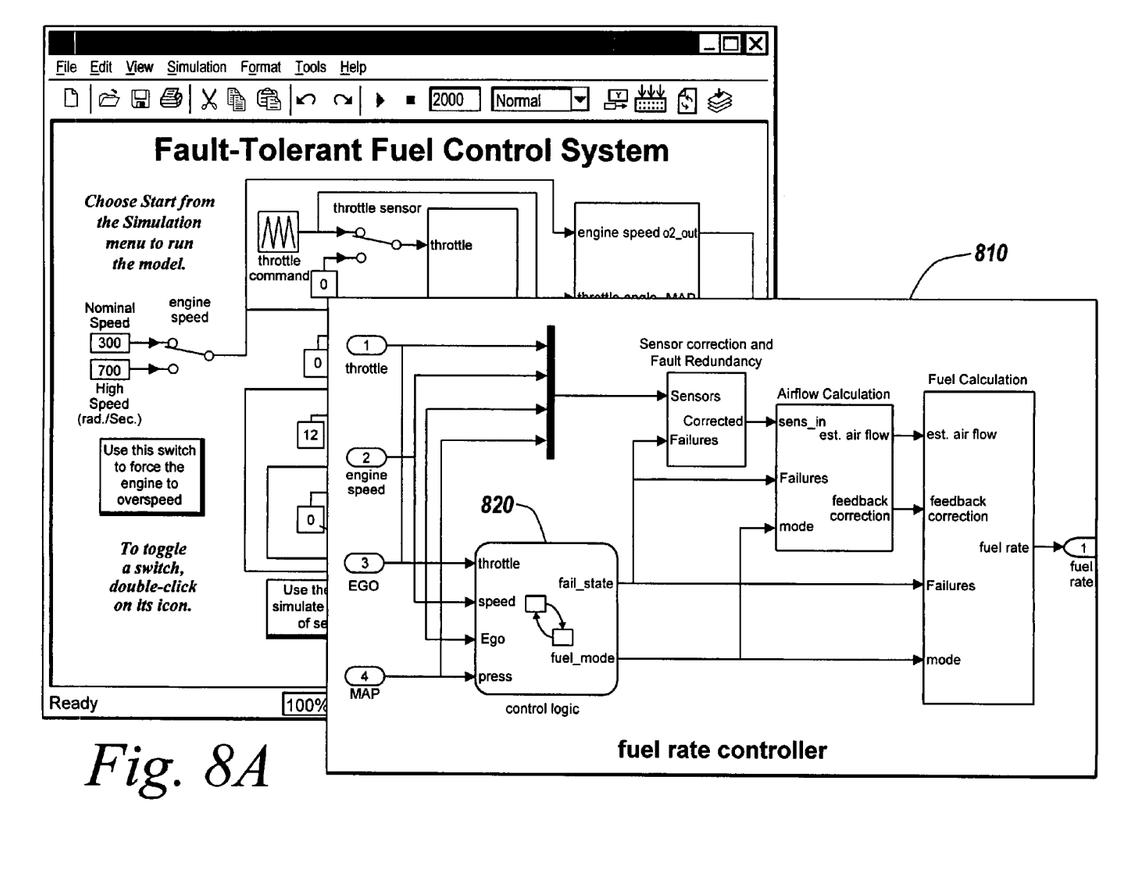
FIG. 8A depicts an exemplary preview window of a block in the block diagram environment.

FIG. 7 is a flow chart showing an exemplary operation of the block diagram environment 300 in connection with the block diagram 600. If the pointer of the pointing device 190 hovers over the subsystem block 610 (step 710), a preview window is provided to display the content of the subsystem (step 720). FIG. 8A depicts an exemplary preview window 810 that displays the content of the subsystem 610. The preview window 810 may be displayed as long as the pointer of the pointing device is placed within the area of the subsystem block 610 and the preview window 830. The preview window 810 may automatically disappear when the pointer of the pointing device 190 is placed out of the area of the subsystem block 510 and the preview window 810.

Figure 8B:
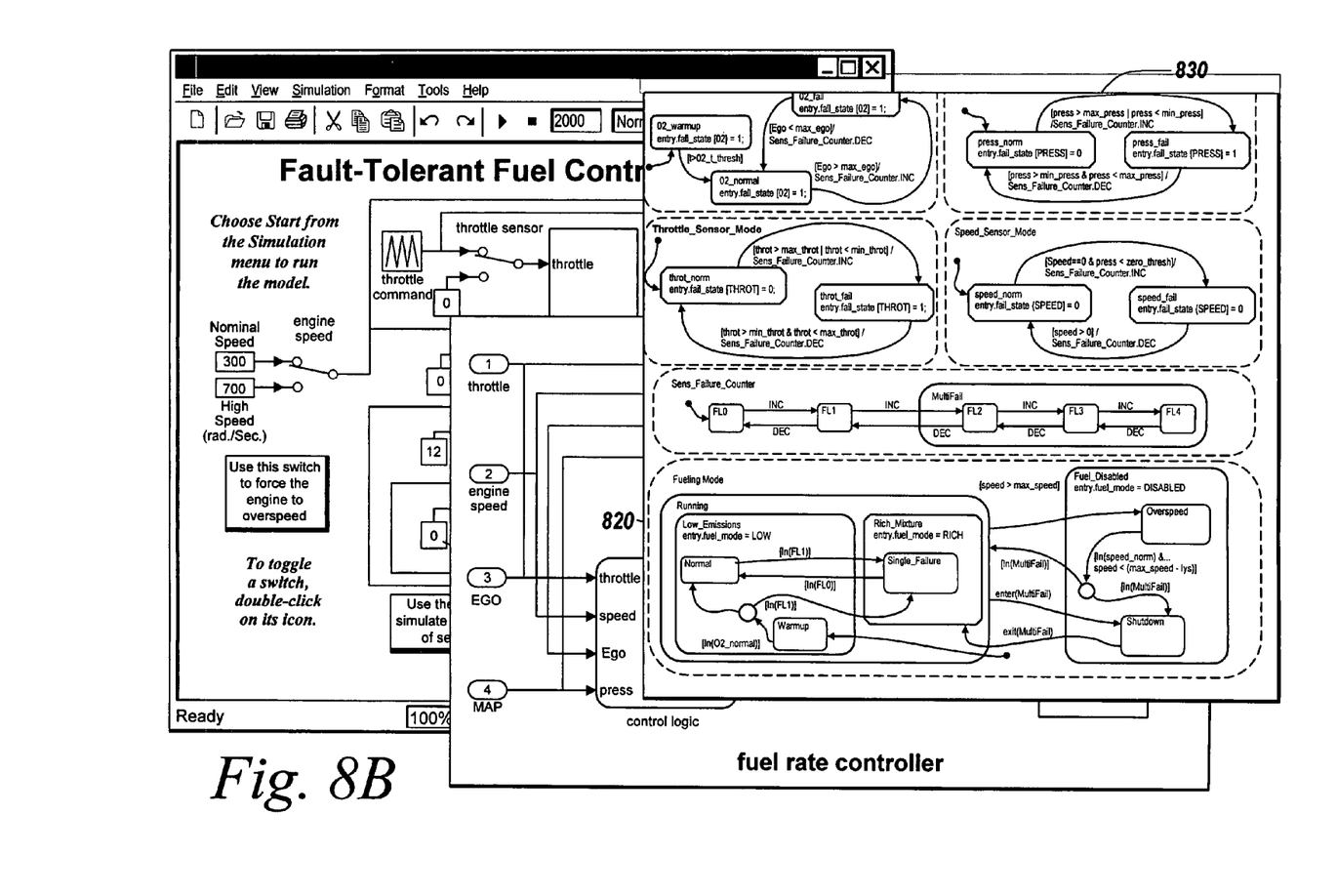
FIG. 8B depicts another exemplary preview window of a block in the block diagram environment.

In this example, the subsystem block 610, the content of which is displayed in the preview window 810, includes another subsystem block 820. If the pointer of the pointing device 190 hovers over the subsystem block 820, an additional cascading preview window 830 is provided to display the content of the subsystem block 820, as depicted in FIG. 8B. The preview window 830 may be displayed as long as the pointer of the pointing device 190 is placed within the area of the subsystem block 820 and the preview window 830. The preview window 830 may automatically disappear when the pointer of the pointing device 190 is placed out of the area of the subsystem block 820 and the preview window 830.

Figure 9:
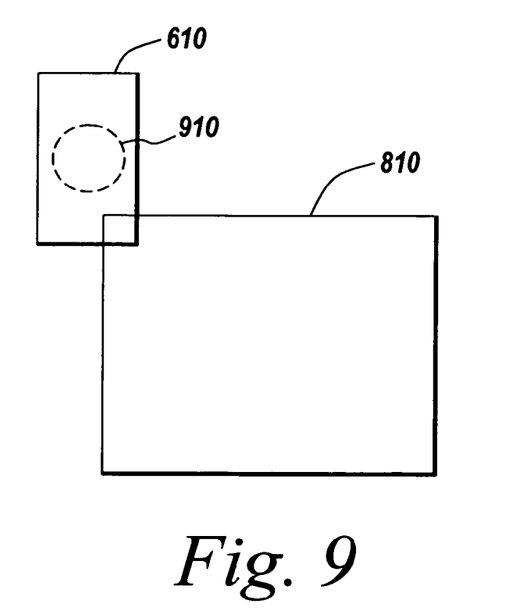
FIG. 9 depicts a hotspot that may trigger the display of a preview window in the block diagram environment.

In the illustrative embodiment, the preview windows 810 and 830 can be provided when the pointer of the pointing device 190 hovers over the subsystem blocks 610 and 810, respectively. One of ordinary skill in the art will appreciate that the area for triggering the display of the preview window may differ in different embodiments. For example, FIG. 9 depicts an exemplary implementation of the present invention in a different embodiment. When the pointer of the pointing device 190 hovers over and enters the boundary of the block 610, a hotspot 910 (dotted circle) is displayed. When the pointer of the pointing device 190 hovers over and enters the boundary of the hotspot 910 (dotted circle), the preview window 810 is provided to display the content of the subsystem block 610. Similarly, one of ordinary skill in the art will appreciate that the area triggering the disappearance of the preview window may differ in different embodiments.

One of ordinary skill in the art will also appreciate that display and disappearance of the preview window may be tied to other events, such as mouse clicks, and disappearance of the preview window may require that the pointer be outside of the hot spot for more than a fixed amount of time.

Figure 10:
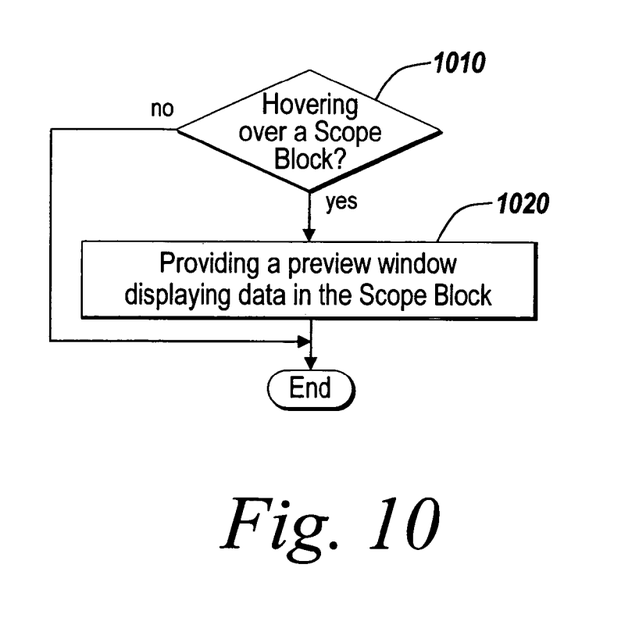
FIG. 10 is a flow chart showing an exemplary operation of the illustrative embodiment of the present invention for displaying the preview window of a scope block in the block diagram environment.
Figure 11:
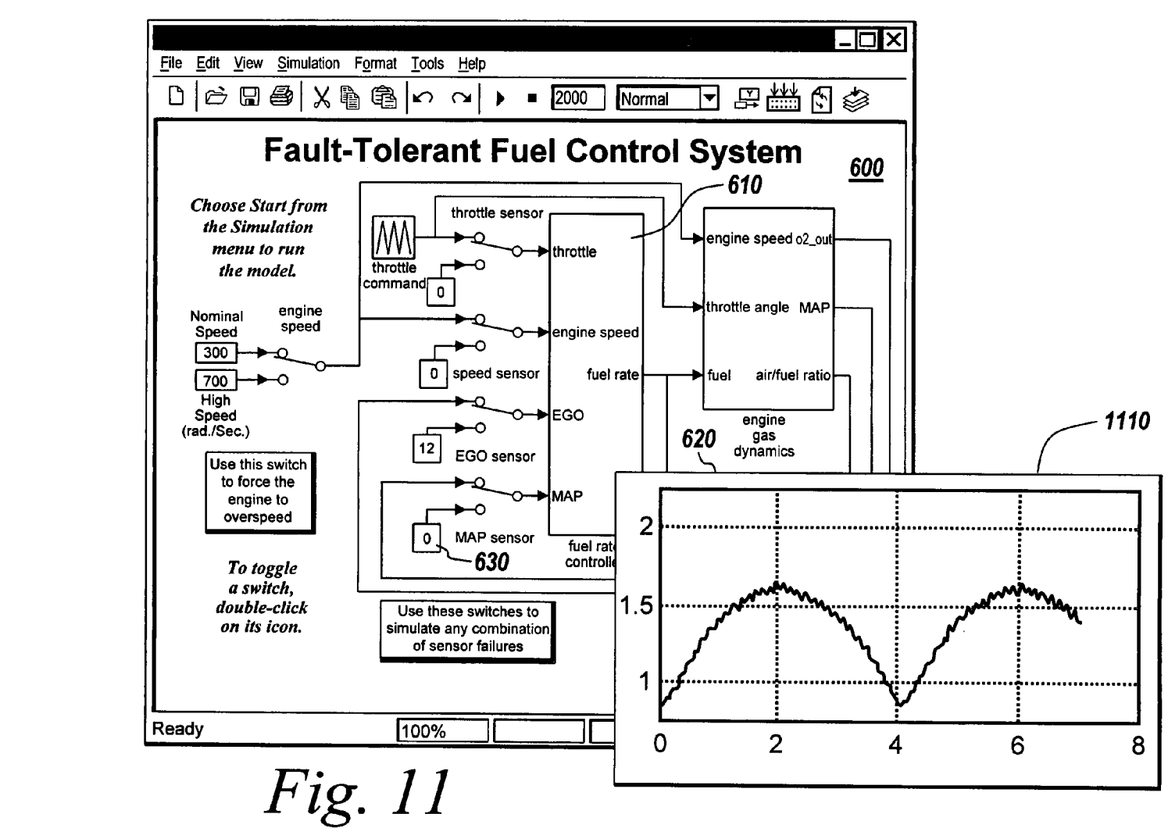
FIG. 11 depicts an exemplary preview window of a scope block in the block diagram environment.

When the pointer of the pointing device hovers over a block that is not a subsystem, a preview window may display a different content of the block depending on the type of the block. FIG. 10 is a flow chart showing an exemplary operation of the block diagram environment 300 when the pointer of the pointing device hovers over a scope block. Assume that the block diagram 600 is executed or simulated and results data is logged in the scope block 620. If the pointer of the pointing device 190 hovers over the scope block 620 (step 1010), a preview window 1110 is provided to display the data logged in the scope block 620 (step 1020), as depicted in FIG. 11. In the illustrative embodiment, the preview window 1110 displays a graph representing the data in the scope block 1100. One of skill in the art will appreciate that the preview window 1120 can display the data in a text-based manner. One of ordinary skill in the art will also appreciate that the preview windows may display other information relating to the blocks in different embodiments. For example, the preview windows may display a dialog box of a selected block.

It will be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any graphical modeling environments. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. A computer-implemented method comprising:
displaying an interface that identifies one or more libraries associated with a block diagram environment for creating or editing a block diagram;
detecting a selection of a library identified in the displayed interface;
displaying, using a computing device, a preview window in response to detecting that the library has been selected in the displayed interface, the preview window being displayed in addition to the displayed interface, the preview window identifying
one or more blocks associated with the selected library;
receiving an indication that a selected one of the blocks displayed in the preview window is to be added to the block diagram based on user interaction with the preview window; and
adding the selected block to the block diagram.

2. The method of claim 1, wherein the indication results from a drag and drop operation.

3. The method of claim 1, wherein detecting further comprises:
detecting whether a pointer of a pointing device hovers over or enters a region, in the displayed interface, associated with the selected library.

4. The method of claim 1, wherein the preview window automatically disappears on a predetermined action of a user.

5. The method of claim 3, wherein the preview window automatically disappears when the pointer of the pointing device hovers out of or exits the region.

6. The method of claim 1, further comprising:
enabling a user to drag a block from the preview window and drop the block in a model window that displays the block diagram of the model.

7. The method of claim 1, further comprising:
highlighting, in the preview window,
an identified block associated with the selected library.

8. A computer-implemented method comprising:
displaying a graphical block diagram of a model in a graphical window, the graphical block diagram having one or more graphical components;
detecting whether a pointer of a pointing device hovers over or enters a region of the displayed graphical block diagram that is associated with a graphical component in the displayed graphical block diagram; and
displaying, using a computing device, a preview window in response to detecting that the pointer of the pointing device is hovering over or entering the region, the preview window presenting content of the graphical component associated with the region, the preview window being displayed in addition to the displayed block diagram, wherein the graphical component associated with the region is a subsystem and the content of the subsystem is presented in the preview window.

9. The method of claim 8, wherein the preview window automatically disappears when the pointer of the pointing device hovers out of or exits the region.

10. A system comprising:
a display device;
a pointing device; and
a processor for:
displaying, on the display device, a block diagram of a model in a model window, the block diagram having one or more components,
detecting whether a pointer, associated with the pointing device, hovers over or enters a region of the displayed block diagram associated with a component in the displayed block diagram,
displaying a preview window in response to detecting that the pointer of the pointing device is hovering over or entering the region, the preview window presenting content of the component associated with the region, the preview window being displayed in addition to the displayed block diagram; and
enabling the user to drag a component from the preview window and drop the component in the model window.

11. The system of claim 10, wherein the preview window automatically disappears when the pointer of the pointing device hovers out of or exits the region.

12. A non-transitory medium for holding instructions executed in a computer, the medium holding one or more instructions for:
displaying a graphical block diagram of a model in a model window, the graphical block diagram having one or more graphical components;
detecting whether a user selects a component in the block diagram of a model;
displaying a preview window in response to detecting that the user selected the component, the preview window presenting content of the graphical component associated with the region, the preview window being displayed in addition to the displayed block diagram; and
enabling the user to drag a component from the preview window and drop the component in the model window.

13. The medium of claim 12, wherein the user selects the component using one of a pointing device or a keyboard.

14. The medium of claim 12, wherein detecting further comprises:
detecting whether a pointer of a pointing device hovers over a region associated with the component on a display device.

15. The medium of claim 14, wherein the preview window automatically disappears when the pointer of the pointing device hovers outside of or exits the region.

16. The medium of claim 12, wherein the presented content includes a graphical representation of one or more sub-components that belong to the component.

17. The medium of claim 12, wherein the preview window automatically disappears on a predetermined action of the user.

18. The medium of claim 12, wherein the presented content is highlighted in the preview window.

19. A non-transitory medium for holding instructions executed in a computer, the medium holding one or more instructions for:
displaying an interface that identifies one or more libraries associated with a block diagram environment;
detecting a selection of a library identified in the displayed interface; and
displaying a preview window in response to detecting that the library has been selected, the preview window being displayed in addition to the displayed interface, the preview window identifying
one or more blocks associated with the selected library;
receiving an indication that a selected one of the blocks displayed in the preview window is to be added to the block diagram based on user interaction with the preview window; and
adding the selected block to the block diagram.

20. The medium of claim 19, wherein the preview window automatically disappears when the pointer of the pointing device hovers out of or exits a predetermined region.

* * * * *